(12) United States Patent
Bunn

(10) Patent No.: US 6,487,961 B2
(45) Date of Patent: Dec. 3, 2002

(54) BREWING BASKET FOR A BREWING FUNNEL

(75) Inventor: Arthur H. Bunn, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/851,304

(22) Filed: May 8, 2001

(65) Prior Publication Data

US 2002/0100370 A1 Aug. 1, 2002

Related U.S. Application Data

(63) Continuation-in-part of application No. 09/772,519, filed on Jan. 29, 2001.

(51) Int. Cl.[7] .................................................. A47J 31/00
(52) U.S. Cl. ........................................ 99/323; 99/306
(58) Field of Search .......................... 99/306, 304, 323, 99/279; 210/473, 474, 477

(56) References Cited

U.S. PATENT DOCUMENTS

| D29,059 S | 7/1898 | Donaldson |
| 2,174,228 A | 9/1939 | Perkins ........................ 226/38 |
| 3,399,780 A | 9/1968 | Macaluso, Jr. et al. ..... 210/469 |
| 3,943,058 A | 3/1976 | Wurm ......................... 210/456 |
| 3,944,112 A | 3/1976 | Miller ........................ 220/90.2 |
| 4,414,884 A | 11/1983 | McLean ....................... 99/304 |
| D315,475 S | 3/1991 | Finger et al. ................ D7/392 |
| 4,999,470 A | 3/1991 | Fuchs, Jr. ................ 219/10.55 |
| 5,064,533 A | 11/1991 | Anson ......................... 210/232 |
| D339,028 S | 9/1993 | Bannigan ..................... D7/400 |
| RE34,473 E | 12/1993 | Ryan et al. ..................... 99/307 |
| 5,590,581 A | 1/1997 | Strub et al. ................... 99/302 |
| 5,865,095 A | 2/1999 | Mulle ........................... 99/293 |
| 6,055,900 A | 5/2000 | Bunn ........................... 99/279 |

*Primary Examiner*—Reginald L. Alexander
(74) *Attorney, Agent, or Firm*—Barnes & Thornburg

(57) ABSTRACT

A wire or other brewing basket adapted to receive a brewing filter and be received by a brewing funnel. The basket comprises a body defining a cavity for receiving the brewing filter and a shield positioned above the body and extending over a portion of the cavity for reducing spillage of brewing material from the funnel. The shield desirably is substantially flat. The basket further includes including mounting structure mounting the shield to the body. Desirably, the mounting structure is in the form of a plurality of stems mounted to a top rim of the body and the shield and extending generally upwardly from the body. The shield in accordance with a preferred embodiment has a generally arcuate configuration, and has an inner arcuate edge and desirably an outer arcuate edge. The radius of curvature of the inner arcuate edge is greater than the radius of curvature of the top rim and desirably the radius of curvature of the top rim.

17 Claims, 3 Drawing Sheets

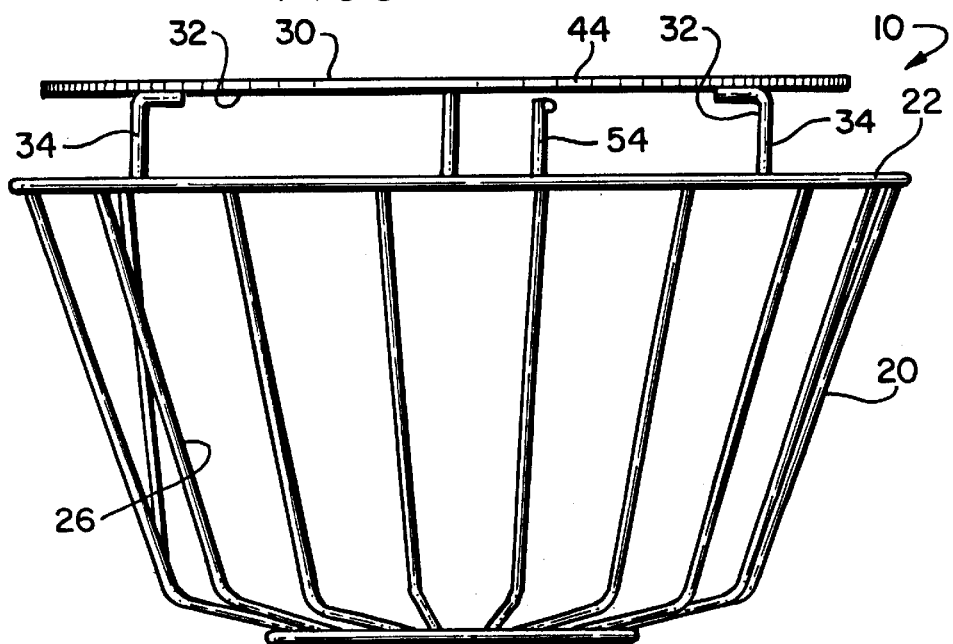
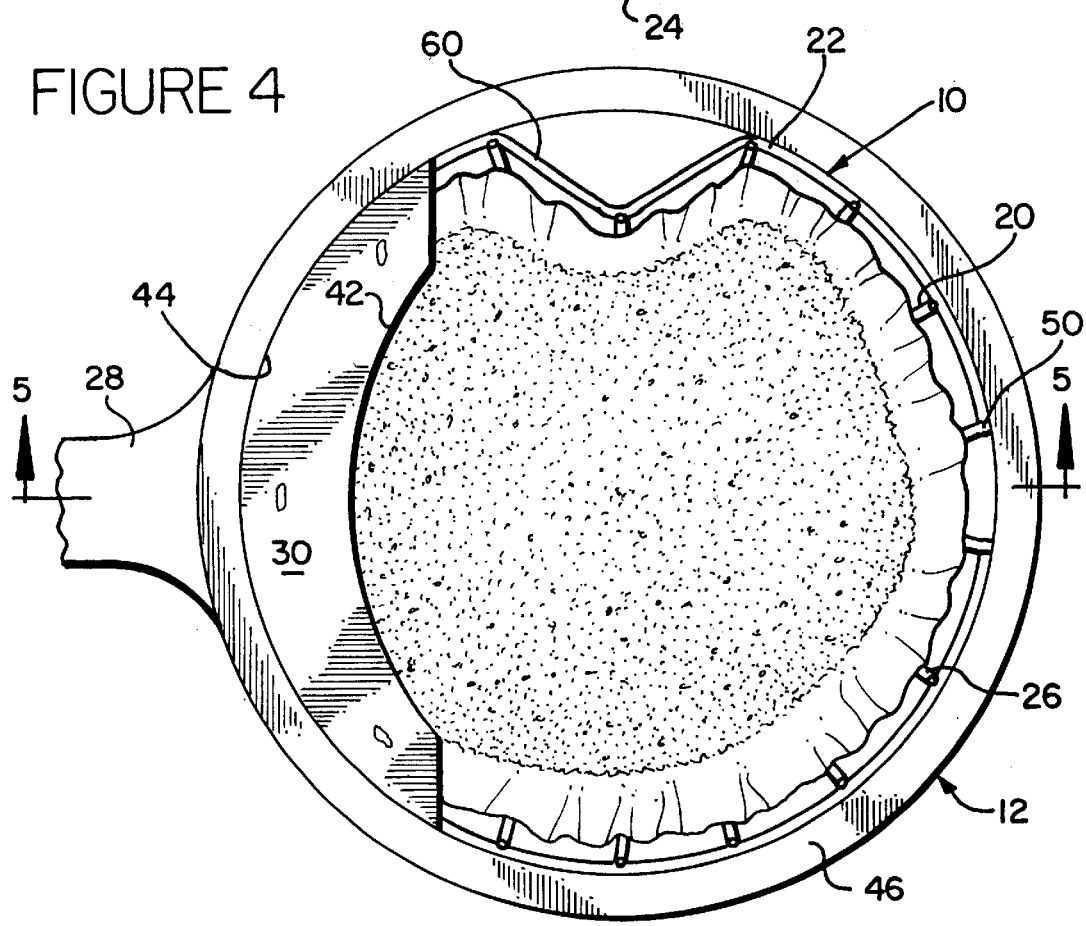

BREWING BASKET FOR A BREWING FUNNEL

This application is a continuation-in-part application of U.S. design patent application Ser. No. 09/772,519, filed on Jan. 29, 2001.

The present invention relates to a brewing basket for a brewing funnel and, more particularly, to a brewing basket adapted to receive a brewing filter and be received by the brewing funnel.

BACKGROUND

Coffee brewers typically include a coffee funnel and a coffee brewing filter that are used during the brewing process. During the brewing process, the coffee brewing filter is received within the funnel and brewing material in the form of water and coffee grinds are received by the funnel. Brewed material passes through the coffee filter and the brewing funnel and into the coffee pot.

Generally speaking, there are two types of coffee brewing funnel assemblies. Coffee brewers that are generally intended for domestic or office use typically use a funnel constructed of plastic, and the filters are placed directly into the funnel. The inside bottom of the funnel typically includes a series of upward projections intended to create spacing between the bottom of the filter and the funnel. Such a spaced relationship is desirable because it avoids sealing that otherwise could occur between the coffee filter and the funnel and thus facilitates a more uniform passage of brewed material from the coffee filter to the coffee pot and results in a higher quality brewed beverage.

The other type of coffee brewer is intended generally for use in a restaurant or other food service or high coffee production setting. The funnel assembly of such other type of coffee brewer typically includes a funnel which is constructed of metal to provide the strength and durability desirable in connection with high volume and continuous coffee production. The funnel assembly usually also includes a coffee filter and a wire brewing basket for supporting the filter in spaced relationship from the brewing funnel to facilitate a uniform passage of brewed material from the coffee filter to the coffee pot.

With either type of coffee brewer, the brewing funnels have a handle which is held by the user's hand when putting the brewing funnel in or removing it from the brewing apparatus. The brewing funnels normally should remain in the brewing apparatus throughout the brewing cycle until all of the brewed beverage has drained therefrom. If a user acting without caution removes the brewing funnel from the brewer when all of the liquid brewed beverage has not fully drained from the brewing funnel, the slurry of liquid brewing material can develop a degree of momentum which moves it toward the handle of the funnel as it is removed. The slurry may splash out of the funnel and onto the user's hand.

Attempts have been known to reduce spillage of brewed material from the coffee funnel in connection with the domestic-type coffee brewer described broadly above. In particular, U.S. patent application Ser. No. 6,055,900, which is incorporated herein by reference, discloses examples of such attempts.

It is an object of the present invention to provide an improved wire brewing basket for use particularly in connection with funnel assemblies of brewers used for high volume coffee production to reduce or eliminate the possibility of brewing material splashing out of the funnel when the funnel is moved during the brewing process.

It is a further object of the present invention to provide such a wire brewing basket that provides sanitation benefits.

SUMMARY

In accordance with these and other objects, the present invention provides a brewing basket adapted to receive a brewing filter and be received by a brewing funnel. The brewing basket comprises a body defining a cavity for receiving the brewing filter and a shield positioned above the body and extending over a portion of the cavity for reducing spillage of brewing material from the funnel. In a preferred embodiment, the brewing basket defines one or more voids between the shield and the body. The brewing basket further includes mounting structure mounting the shield to the body that desirably is in the form of a plurality of stems mounted to a top rim or other portion of the body and the shield and extending generally upwardly from the top rim or other portion. The shield in accordance with a preferred embodiment has a generally arcuate configuration, including an inner arcuate edge and an outer arcuate edge. The radius of curvature of the inner arcuate edge is greater than the radius of curvature of the top rim so that the expanse of the shield over the cavity is greater near the center of the shield than the ends of the shield. The brewing basket desirably is in the form of a wire brewing basket.

The brewing basket in accordance with a preferred embodiment of the invention is effective in reducing or eliminating spillage of brewing material contained within the brewing funnel. Positioning the shield above the body of the basket with mounting stems provides several significant additional benefits. For example, the shield's ability to prevent spillage is increased because it is at a higher position relative to the brewing material. Additionally, the mounting stems avoid inclusion of corners between the body of the brewing basket and the shield which eliminates sanitation concerns that may be caused by the presence of corners in beverage dispensing equipment.

Other objects, advantages and novel features of the present invention will become apparent from the following detail description of the drawings when considered in conjunction with the accompanying drawings.

BRIEF DESCRIPTION OF THE DRAWINGS

FIG. 3 is a side elevation view of the wire basket of FIG. 1;

FIG. 4 is a top view of the wire basket and brewing funnel of FIG. 1, also illustrating a brewing filter and brewing material in the form of coffee grinds therein.

DETAILED DESCRIPTION OF THE DRAWINGS

Figure 1:
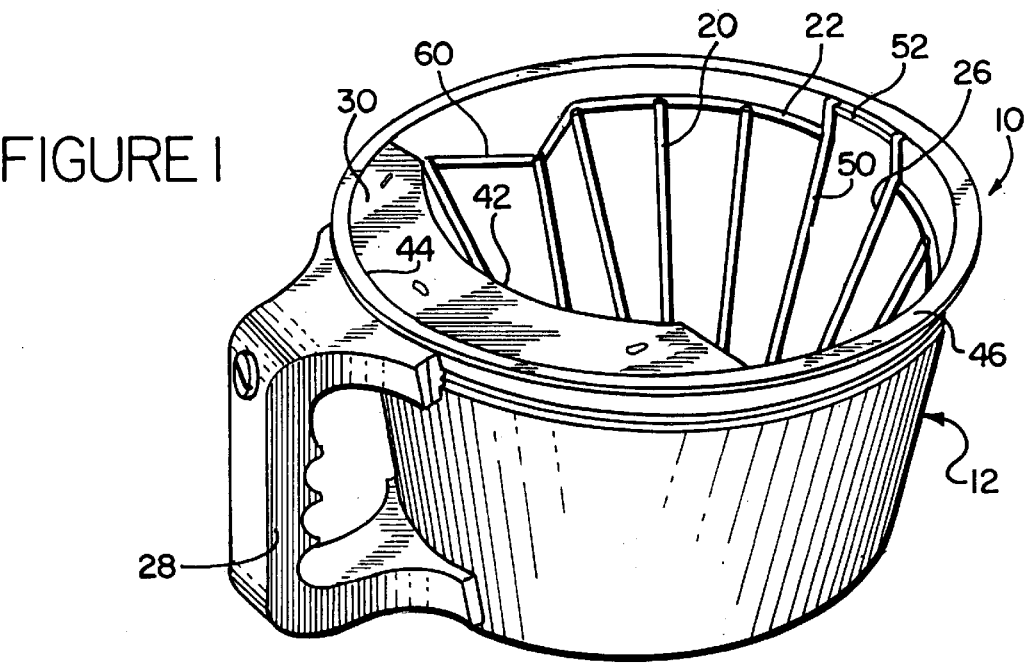
FIG. 1 is a perspective view of a wire basket in accordance with a preferred embodiment of the present invention received by a brewing funnel.
Figure 2:
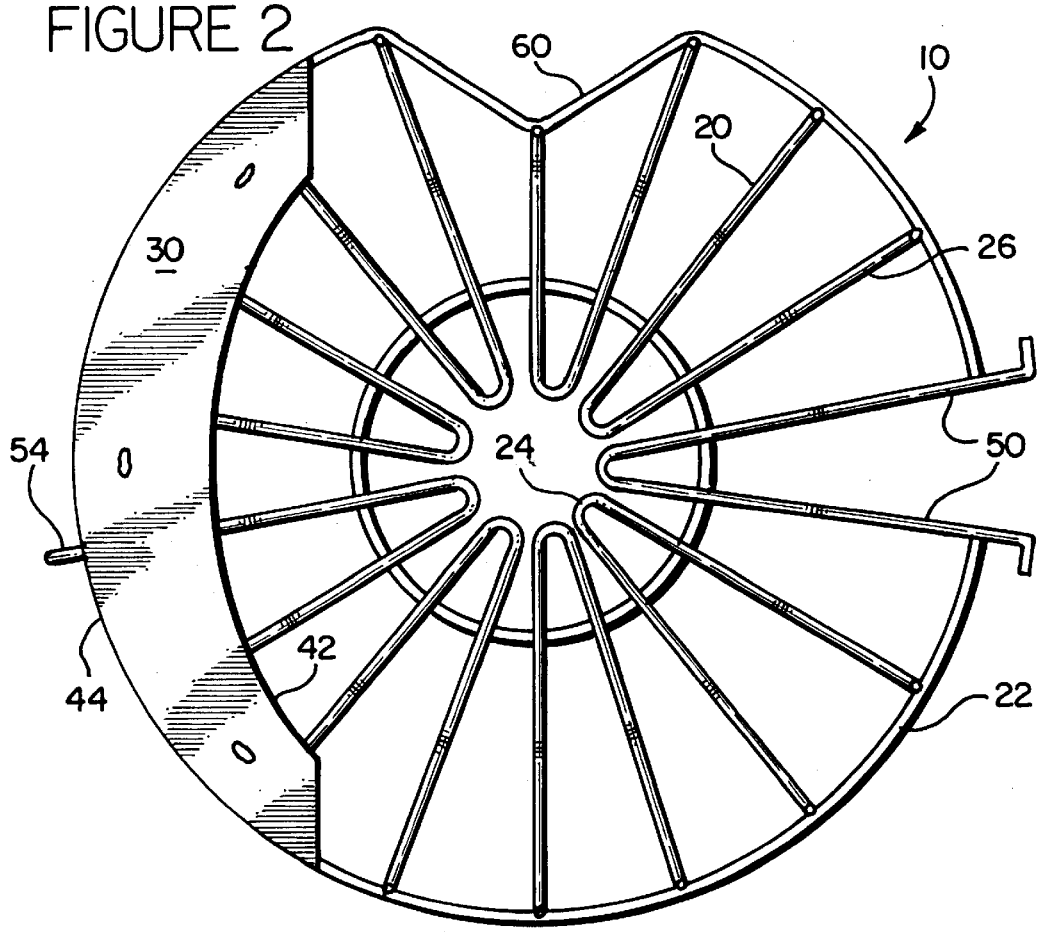
FIG. 2 is a top view of the wire basket of FIG. 1.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Figure 5:
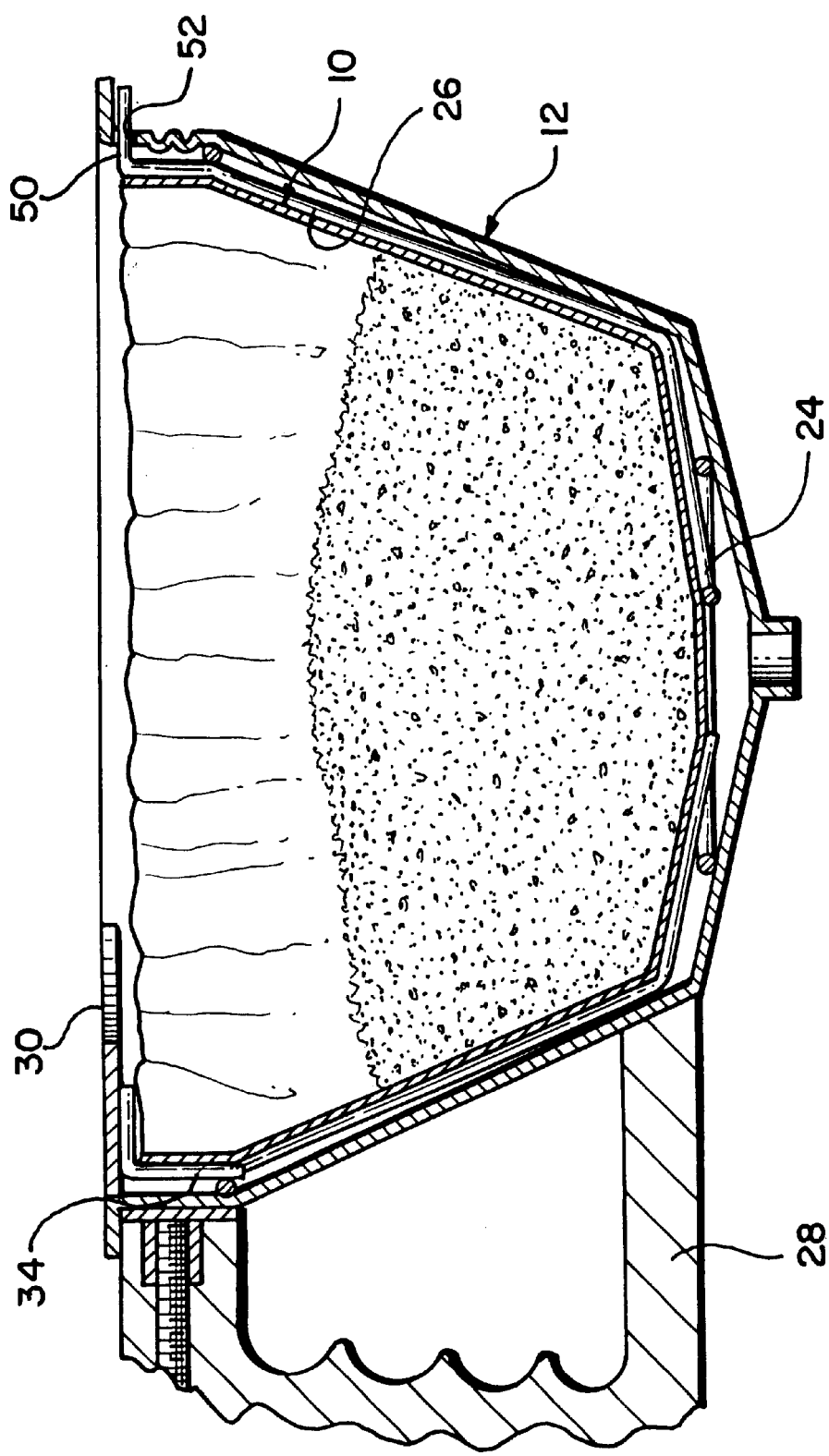
FIG. 5 is a cross sectional view taken along lines 5—5 of FIG. 4.

FIG. 1 illustrates a foraminal brewing basket in the form of a wire brewing basket 10 in accordance with a preferred embodiment of the present invention received by a brewing funnel 12. The brewing basket 10 illustrated in FIGS. 1–5 has a truncated funnel shape and comprises a body 20 having a top rim 22 and a bottom 24. The top rim 22 extends substantially around the perimeter of the top of the body 20 and is generally circular. The brewing basket 10 defines a cavity 26 adapted to receive the brewing material which prior to the brewing process is in the form of coffee grinds (see, e.g., FIGS. 4 and 5). During the brewing process, the brewing material typically includes a mixture of coffee grinds and hot water. The illustrated funnel 12 also has a truncated funnel shape, and includes a handle 28 for manual movement of the funnel to facilitate placement of the funnel before the brewing process and removal of the funnel after the brewing process has been completed.

The brewing basket 10 includes a shield 30 for reducing spillage of brewing material from the funnel 12, including, in particular, spillage that may occur when the funnel is moved before the brewing process has been completed. In accordance with a preferred embodiment of the invention, the shield 30 is positioned above the top rim 22 of the brewing basket 10, and the shield and body 20 define a plurality of voids 32 between the top rim and the shield. The shield 30 desirably is mounted to the body 20 in any suitable manner. In the illustrated embodiment, for example, the brewing basket 10 includes a plurality of upwardly extending stems 34 that interconnect the top rim 22 and the shield 30. The illustrated stems 34 have an inverted L-shaped construction with the top portion of each stem being welded to the bottom of the shield 30 (see, e.g., FIG. 3). The illustrated construction, and in particular the stems 34, avoid inclusion of corners associated with the shield 30 to minimize any sanitation concerns.

The shield 30 may have any suitable configuration. In a preferred embodiment, for example, the shield 30 is generally flat and has a generally accurate configuration including an inner arcuate edge 42 and an outer arcuate edge 44. The inner arcuate edge 42 desirably has a radius of curvature that is greater than the radius of curvature of the top rim 22 to create a greater area of expanse near a center of the shield.

The brewing basket 10 desirably nests within the funnel 12 such that the shield 30 is substantially centered relative to the handle 28 of the funnel. Additionally, the funnel 12 and brewing basket 10 desirably are dimensioned such that the shield 30 is immediately adjacent or slightly below a top rim 46 of the funnel when received by the funnel. If desired, the brewing basket 10 may also include any suitable additional structure to facilitate securement and the desired positioning of the brewing basket within the funnel 12. In the illustrated embodiment, for example, the brewing basket 10 includes a flexible or compressible fork structure 50 which is received within a slot 52 defined by the brewing basket, and a flexible prong 54 which is received in a hole (not shown) of the funnel 12. The illustrated brewing basket 10 also may define an override channel 60 for receiving a water conduit (not shown) for overriding the coffee filter when desired.

Accordingly, the brewing basket 10 in accordance with a preferred embodiment of the invention is able to retain within the funnel 12 brewing material during manual movement of the funnel. Positioning the shield 30 above the body 20 of the brewing basket 10 substantially increases the effectiveness of the shield in preventing spillage of brewing material during manual movement of the funnel 12. The inner arcuate edge 42 of the shield 30, and the centering of the shield relative to the handle 28 so that the greatest expanse of the shield is adjacent the handle, further substantially increase the effectiveness of the shield in preventing spillage of brewing material during manual movement of the funnel 12. Moreover, the use of stems 34 reduces sanitation concerns that otherwise could arise in connection with the inclusion of the shield 30.

Although the invention has been described and illustrated in detail with reference to preferred embodiments, it is to be clearly understood that the same is by way of illustration and example only, and is not to be taken by way of limitation. The spirit and scope of the present invention are to be limited only by terms of the appended claims.

What is claimed is:

1. A brewing basket adapted to receive a brewing filter and be received by a brewing funnel with a handle on the outside surface thereof, the brewing basket comprising:
   (a) a body defining a cavity for receiving the brewing filter;
   (b) a shield positioned above the body, extending generally over a portion of the cavity, and generally adjacent to the handle for reducing spillage of brewing material from the brewing funnel.

2. The brewing basket of claim 1 defining a void between the body and the shield.

3. The brewing basket of claim 1 wherein the shield is substantially flat.

4. The brewing basket of claim 1 further including mounting structure mounting the shield to the body.

5. The brewing basket of claim 4 wherein the mounting structure includes at least one stem mounted to the body and the shield and extending generally upwardly from the body.

6. The brewing basket of claim 1 wherein the body includes a top rim adjacent the shield having a radius of curvature, and wherein the shield has an inner arcuate edge having a radius of curvature, the radius of curvature of the inner arcuate edge being greater than the radius of curvature of the top rim.

7. The brewing basket of claim 1 comprising a wire basket.

8. A brewing basket adapted to receive a brewing filter and be received by a brewing funnel, the brewing basket comprising:
   (a) a body defining a cavity for receiving the brewing filter; and
   (b) a shield positioned above the body and extending over a portion of the cavity for reducing spillage of brewing material from a brewing funnel;
   wherein the body includes a top rim and further includes a plurality of stems mounting the shield to the top rim.

9. The brewing basket of claim 8 wherein the stems define a plurality of voids between the top rim and the shield.

10. A wire brewing basket adapted to receive a brewing filter and be received by a brewing funnel, the wire brewing basket comprising:
    (a) a body defining a cavity and including a top rim; and
    (b) a shield mounted to the top rim by at least one stem extending generally upwardly from the top rim, the shield positioned above the top rim and extending over a portion of the cavity for reducing spillage of brewing contents from the funnel.

11. The brewing basket of claim 10 wherein the stem defines a void between the body and the shield.

12. The brewing basket of claim 10 further including a plurality of stems mounting the shield to the top rim, the stems defining a plurality of voids between the top rim and the shield.

13. The wire brewing basket of claim 10 wherein the shield is substantially flat.

14. The wire brewing basket of claim 13 wherein the top rim has a radius of curvature, and wherein the shield has an inner arcuate edge having a radius of curvature, the radius of curvature of the inner arcuate edge being greater than the radius of curvature of the top rim.

15. A wire brewing basket adapted to receive a brewing filter and be received by a brewing funnel, the wire brewing basket comprising:

(a) a body defining a cavity and including a top rim;

(b) a substantially flat shield having an inner arcuate edge for reducing spillage of brewing material from the funnel; and (c) a plurality of stems mounting the shield to the top rim such that the shield is positioned above the top rim and over a portion of the cavity, the stems defining a plurality of voids between the shield and the body.

16. The wire brewing basket of claim 15 wherein the top rim has a radius of curvature, and wherein the inner arcuate edge of the shield has a radius of curvature, the radius of curvature of the inner arcuate edge being greater than the radius of curvature of the top rim.

17. The wire brewing basket of claim 16 wherein the shield is substantially flat.

* * * * *